UNITED STATES PATENT OFFICE.

ALFRED E. HUNT, OF PITTSBURG, PENNSYLVANIA.

REFRACTORY BRICK.

SPECIFICATION forming part of Letters Patent No. 504,584, dated September 5, 1893.

Application filed May 15, 1893. Serial No. 474,332. (No specimens.)

*To all whom it may concern:*

Be it known that I, ALFRED E. HUNT, of Pittsburg, in the county of Allegheny and State of Pennsylvania, have invented a new and useful Improvement in Refractory Bricks, of which the following is a full, clear, and exact description.

The object of my invention is to provide a highly refractory brick for lining metallurgical furnaces, &c., which shall be neutral chemically as respects basic slags, so that it shall be especially suitable for the linings of basic furnaces, as well as for other purposes where highly refractory bricks are needed. By reason of the large proportion of silicic acid in bricks composed of silica or clay they are easily corroded by the slag used in such furnaces, and their rapid destructibility renders them undesirable.

My improved brick is principally composed of bauxite. This material as found in nature is a hydrated alumina, containing small proportions of impurities such as silica, oxide of iron, and titanic acid. The titanic acid is not injurious for the purpose for which my brick is used, but an excess of silica is injurious in that it renders the brick corrodible, and an excess of oxide of iron renders it easily fusible. The bauxite selected for the bricks must therefore not contain more than seven per cent. of silica, or more than seven per cent. of oxide of iron. It preferably contains a considerably less proportion of these impurities, viz: about one and one-half per cent. of silica and three fourths (¾) per cent. of sesquioxide of iron, for bauxite containing these substances in such small proportions is easily obtainable. Such bauxite is found in large quantities in Bartow county, in the State of Georgia. Native bauxite contains about thirty per cent. of water of hydration. This is preferably expelled by calcining before the brick is compounded, but while very desirable, such preliminary calcining is not essentially necessary.

In making the brick I add to the calcined bauxite milk of lime in sufficient quantity to render the bauxite somewhat plastic so that it may be molded, and to yield in the finished brick from one to four per cent. of lime, the principle being that there should be as little lime in the brick as possible, enough being employed to serve as a bond for the bauxite. Care must be taken that the lime be well burned before it is mixed with the bauxite, since otherwise the evolution of the carbonic acid gas during the burning of the bricks will disintegrate them.

The bauxite mixed with milk of lime as above stated is molded into bricks by powerful pressure, and the bricks when dried are baked at a very high heat,—as nearly white heat as possible, in the same way as is ordinarily done in the manufacture of silica or clay bricks. They are then ready for use.

Bricks made as described above will be found to be of very great utility. They are so refractory that they will not fuse under the high temperatures of metallurgical furnaces, and their chemically neutral nature enables them to be used in basic furnaces with much greater success than the silica and clay bricks ordinarily employed.

Within the scope of my invention variations may be made in the proportions of the materials of which the bricks are composed, the only requisite being that the brick shall not contain silica or iron oxide in greater proportion than I have named, and that the lime be used in small proportion, its function being to serve as a bond.

I claim—

A refractory brick composed of bauxite bonded with a small proportion of lime, pressed and baked, substantially as described.

In testimony whereof I have hereunto set my hand.

ALFRED E. HUNT.

Witnesses:
W. P. POTTER,
T. W. BAKEWELL.